Jan. 18, 1966 R. KRYSMANSKI 3,230,427
SEMICONDUCTOR RECTIFIER DEVICE WITH A STACK RECTIFIER TABLETS
Filed Feb. 5, 1962
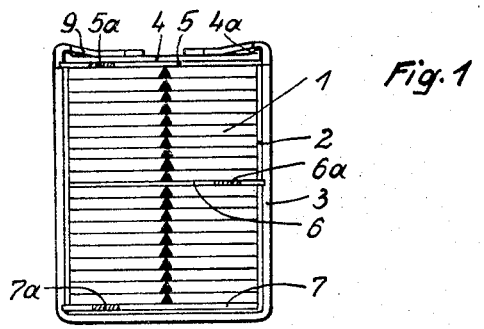
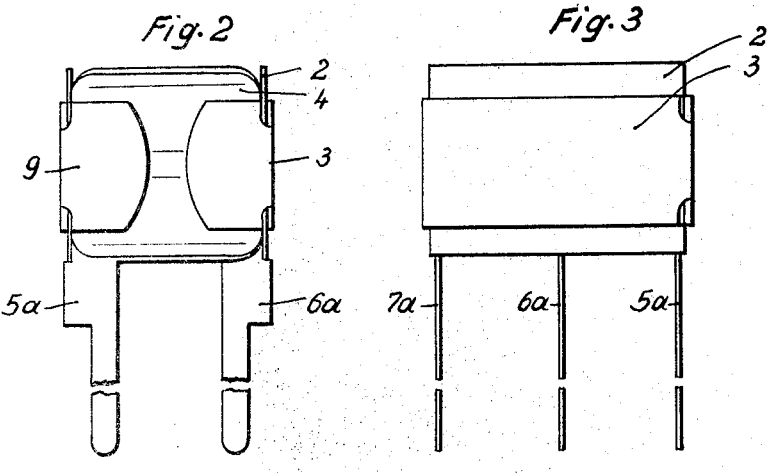
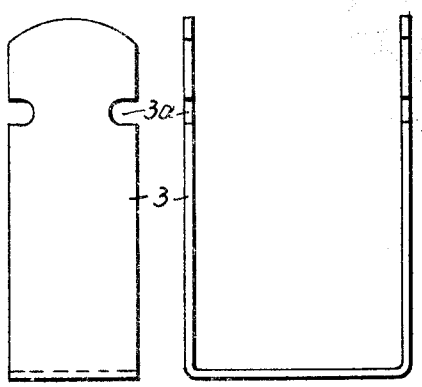
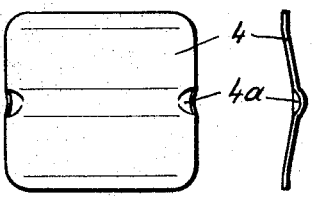
Inventor:
Reiner Krysmanski

United States Patent Office 3,230,427
Patented Jan. 18, 1966

3,230,427
SEMICONDUCTOR RECTIFIER DEVICE WITH A STACK OF RECTIFIER TABLETS
Reiner Krysmanski, Berlin-Reinickendorf, Germany, assignor to Siemens-Schuckertwerke Aktiengesellschaft, Berlin-Siemensstadt, Germany, a corporation of Germany
Filed Feb. 5, 1962, Ser. No. 170,953
Claims priority, application Germany, Feb. 9, 1961, S 72,445
3 Claims. (Cl. 317—234)

My invention relates to semiconductor rectifier devices composed of stacks or columns of individual tablets, wafers, discs, pellets or the like rectifier elements, particularly of miniature size.

In known devices of this type a generally U-shaped metal bracket or clamp, lined with insulating foil, straddles the stack of rectifier elements and has its leg ends laterally bent over the stack for holding it together. A leaf spring placed between these leg ends and the adjacent stack maintains contact pressure. In producing such dry-rectifier devices, the lengths of the bracket legs are limited depending upon the strength and stiffness of the bracket material. As a rule, the stiffness and rigidity of the bracket material is not sufficient to hold together stacks of relatively great height because of external mechanical forces which may cause the long legs of the bracket to spread apart.

It is an object of my invention to devise an improved stack-type rectifier device, generally of the abovementioned type, having a stack of individual elements of much greater height than usual without unduly reducing its strength and mechanical resistance.

According to a feature of my invention, I provide the leaf spring located between the laterally bent leg ends of the bracket that straddles and surrounds the stack of rectifier elements with raised portions that are located in the respective bights of the leg ends and I direct the raised portions toward these ends. Furthermore, I bend the leg ends away from the main portion of each leg to an angle less than 90° at a locality above the adjacent raised portion of the leaf spring, each leg end thus extending in a generally inclined direction inwardly and toward the bottom of the U-shaped bracket configuration toward the stack and against the leaf spring thereby exerting pressure upon the spring.

In such a rectifier device according to my invention, the raised portions of the leaf spring are undercut or braced by the elbow or bight portions of the laterally bent leg ends and thus prevent a spreading apart of the bracket legs even if the rectifier stack embraced by the bracket has relatively great height. It is therefore not necessary, for increasing the stiffness of the bracket legs, to increase the cross section of the legs or to employ a material of higher mechanical strength. The advantage of employing a material of lower strength does not only reside in better machinability and more favorable production of such a device but also in the fact that when the leg ends of the bracket are being bent and pressed upon the stack of rectifier tablets, the raised portions of the leaf spring become somewhat pressed into the surface of the metal bracket and thereby improve the reliability of connection.

According to another feature of the invention, I provide the metal bracket or clamp with lateral notches at the locations where the above-mentioned leg ends curve inwardly and away from the main leg portion. The notches serve the purpose to accurately define the bending locations and to reduce the bending radius of the legs by the resulting reduction in cross section of the bracket, thus affording a more exact bending and shaping of the bracket legs.

An embodiment of the rectifier device according to the invention is illustrated by way of example in the accompanying drawing, wherein:

FIG. 1 shows a bottom view, FIG. 2 a front view and FIG. 3 a lateral view of an embodiment of the device, of the present invention;

FIGS. 4 and 5 are two mutually perpendicular views of the metal bracket or clamp member prior to being assembled with the stack of rectifier plates; and FIGS. 6 and 7 are two mutually perpendicular views of a leaf spring which also forms part of the device shown in FIG. 1 to 3.

Denoted in FIG. 1 by the character 1 are twenty selenium rectifier tablets. The forward conductance direction of each tablet is schematically indicated by a black arrow head. It is assumed that the entire rectifier device is electrically connected in the so-called doubler connection, this being, however, not essential to the invention. The tablets 1 are stacked upon each other within a U-shaped metal clamp or bracket 3 which is lined with an insulating foil 2. The foil 2 may consist of pressed cellulose fibers, cellulose triacetate, polycarbonate synthetic plastic, or other suitable insulating material. The foil 2 covers the bottom and two lateral surfaces of the stack of tablets. Placed upon the top of the stack is a leaf spring 4 which is provided with raised portions or bosses 4a. These bosses are located in the elbow or bight areas of the leg ends, as is apparent from FIG. 1. The leaf spring is pressed upon the stack by the laterally bent and downwardly inclined upper ends 9 of the bracket 3.

According to FIGS. 4 and 5 the legs of the bracket 3 are provided with lateral notches 3a. The stack of tablets 1 is assembled with three contact sheets 5, 6 and 7 which are required for electrically interconnecting the elements to form rectifier circuits and are provided with respective terminal portions 5a, 6a and 7a for attachment of electric leads. The device according to FIGS. 1, 2 and 3 constitutes a rugged mechanical unit which, once assembled, can be tested and, if desired, can be subjected to a subsequent electric forming treatment.

When assembling the device, the stack consisting of the parts 1, 5, 6 and 7 is inserted between the legs of the insulatingly lined metal bracket 3. Then the leaf spring, according to FIGS. 6 and 7, is placed on top of the stack. Thereafter the leg ends 9 of the bracket 3 are bent laterally and inwardly at the height of the notches 3a above the raised bosses 4a of the leaf spring 4. In this manner the bending of the leg ends 9 is carried out over an angle of more than 90° so that the bent portion forms an angle of less than 90° with the legs. The downwardly inclined ends 9 are pressed upon the leaf spring 4 so that the bosses 4a are undercut and are slightly pressed into the surface of the metal bracket. Since the notches in the bracket legs at the bending location reduce the cross section, relatively little force is required for accurately bending the leg ends with a small curvature radius. By virtue of such a small radius at the curvature within the bracket where each boss 4a is located, the bracket legs are firmly anchored to the stack. That is, the bosses 4a, resting firmly against the material of the downwardly inclined leg ends, oppose any tendency of the legs to become spread apart.

The invention is particularly advantageous in conjunction with rectifier systems as disclosed in the copending application Serial No. 138,360 of Rudolf Benda et al., assigned to the assignee of the present application. This application relates to a method of producing semiconductor rectifier devices in a series of types, according to which rectifier tablets or the like elements are mechanically or automatically assembled together with connecting sheet members to form elementary rectifier systems in electric doubler connection which, in turn, can be inserted, together with other such systems into a common housing in order to form a rectifier network or system of any desired kind. Such modular rectifier systems can be provided with individual modules or rectifier units designed in accordance with the present invention as exemplified by FIGS. 1 to 3, the rectifier tablets and connecting sheet members being partly replaced by metallic blind plates wherever needed. By virtue of the invention, such an elementary rectifier unit possesses sufficient mechanical strength against external forces even if the stacks of tablets are relatively high.

I claim:

1. A semiconductor rectifier device comprising a plurality of adjacent rectifier tablets forming a stack, a U-shaped bracket surrounding said stack and having a center portion parallel to the tablets and having legs extending from the center portion along the stack, said legs terminating at the end of the stack opposite the center portion in tabs extending toward each other so as to embrace said stack, said tabs forming bights with the respective legs, and a leaf spring in pressure exerting position between said tabs and said stack, said leaf spring having raised portions located in the bight areas of the tabs and directed against the tabs, said tabs forming above the raised portions an acute angle relative to the legs and extending toward the interior of the bracket into pressure contact with the leaf spring.

2. A semiconcuctor rectifier device comprising a plurality of adjacent rectifier tablets forming a stack, a U-shaped bracket surrounding said stack and having a center portion parallel to the tablets and having legs extending from the center portion along the stack, insulating liner means between said bracket and said stack, said legs terminating at the end of the stack opposite the center portion in tabs extending toward each other so as to embrace said stack, said tabs forming bights with the respective legs, and a leaf spring in pressure exerting position between said tabs and said stack, said leaf spring having raised portions located in the bight areas of the tabs and directed against the tabs, said tabs forming above the raised portions an acute angle relative to the legs and extending toward the interior of the bracket into pressure contact with the leaf spring, and terminal means for connecting the tablets in said stack to an electrical circuit, said rectifier tablets being uniformly poled.

3. A semiconductor rectifier device comprising a plurality of adjacent rectifier tablets forming a stack, a U-shaped bracket surrounding said stack and having a center portion parallel to the tablets and having legs extending from the center portion along the stack, said legs terminating at the end of the stack opposite the center portion in tabs extending toward each other so as to embrace said stack, said tabs forming bights with the respective legs, and a leaf spring in pressure exerting position between said tabs and said stack, said leaf spring having raised portions located in the bight areas of the tabs and directed against the tabs, said tabs forming above the raised portions an acute angle relative to the legs and extending toward the interior of the bracket into pressure contact with the leaf spring, said tabs having at the location where they join the legs lateral notches.

References Cited by the Examiner

UNITED STATES PATENTS 2,454,846 11/1948 Skinker _____ 317—234
2,999,963 9/1961 Schneider _____ 317—234

JOHN W. HUCKERT, *Primary Examiner.*

JAMES D. KALLAM, *Examiner.*

J. A. ATKINS, *Assistant Examiner.*